United States Patent
Fiekens et al.

(10) Patent No.: US 10,647,575 B2
(45) Date of Patent: *May 12, 2020

(54) OZONE GENERATOR WITH POSITION-DEPENDENT DISCHARGE DISTRIBUTION

(71) Applicant: XYLEM IP MANAGEMENT S.À R.L., Senningerberg (LU)

(72) Inventors: Ralf Fiekens, Schlossholte-Stukenbrock (DE); Reiner Fietzek, Herford (DE); Manfred Salvermoser, Herford (DE); Nicole Brüggemann, Enger (DE)

(73) Assignee: XYLEM IP Management S.à r.l., Senningerberg (LU)

( * ) Notice: Subject to any disclaimer, the term of this patent is extended or adjusted under 35 U.S.C. 154(b) by 329 days.

This patent is subject to a terminal disclaimer.

(21) Appl. No.: 15/552,678

(22) PCT Filed: Jan. 15, 2016

(86) PCT No.: PCT/EP2016/050790
§ 371 (c)(1),
(2) Date: Jan. 9, 2018

(87) PCT Pub. No.: WO2016/134880
PCT Pub. Date: Sep. 1, 2016

(65) Prior Publication Data
US 2018/0186637 A1  Jul. 5, 2018

(30) Foreign Application Priority Data
Feb. 23, 2015 (DE) .................. 10 2015 002 103

(51) Int. Cl.
*C01B 13/11* (2006.01)
*H01T 19/00* (2006.01)
*H01T 23/00* (2006.01)

(52) U.S. Cl.
CPC .............. *C01B 13/11* (2013.01); *H01T 19/00* (2013.01); *H01T 23/00* (2013.01);
(Continued)

(58) Field of Classification Search
CPC . C01B 13/11; C01B 2201/12; C01B 2201/14; C01B 2201/22; H01T 19/00;
(Continued)

(56) References Cited

U.S. PATENT DOCUMENTS 5,956,562 A  9/1999 Lo et al.
6,106,788 A  8/2000 Rau et al.
(Continued)

FOREIGN PATENT DOCUMENTS

DE   102011008947 A1   7/2012
JP      0811205 A       3/1996
(Continued)

OTHER PUBLICATIONS

International Search Report and Written Opinion for International Application No. PCT/EP2016/050790, dated Apr. 4, 2016—8 Pages.
(Continued)

*Primary Examiner* — Xiuyu Tai
(74) *Attorney, Agent, or Firm* — RatnerPrestia

(57) ABSTRACT

An ozone generator includes a high-voltage electrode and at least one counter electrode, which define an interstice in which at least one dielectric is arranged and through which a gas flows in the flow direction, the high-voltage electrode and the at least one counter electrode being provided with a connection for an electrical voltage supply to generate silent discharges, and a wire fabric being arranged in the gas flow and its density decreasing in the flow direction.

15 Claims, 2 Drawing Sheets

Figure 1:
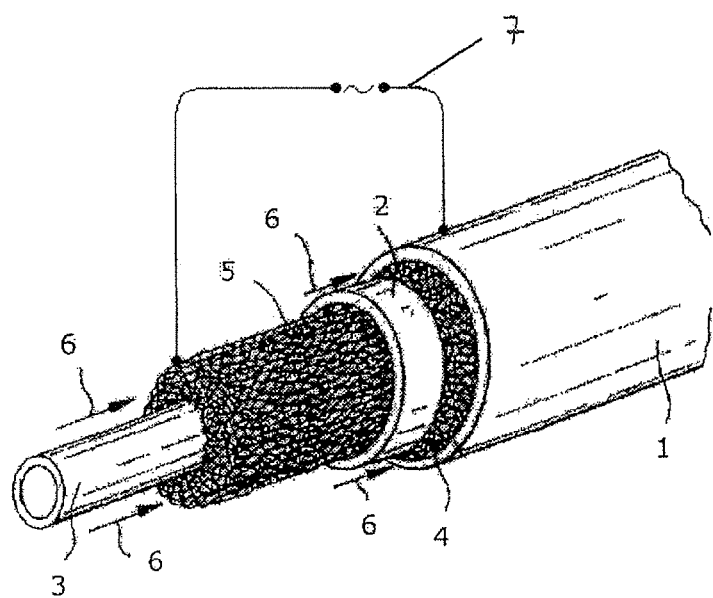

(52) U.S. Cl.
CPC ...... *C01B 2201/12* (2013.01); *C01B 2201/14* (2013.01); *C01B 2201/22* (2013.01)

(58) Field of Classification Search
CPC ......... H01T 23/00; B01J 19/08; B01J 19/088; B01J 19/00
See application file for complete search history.

(56) References Cited

U.S. PATENT DOCUMENTS

| | | | |
|---|---|---|---|
| 8,728,402 B2 * | 5/2014 | Vezzu | C01B 13/11 204/176 |
| 8,808,634 B2 | 8/2014 | Fietzek et al. | |
| 9,174,188 B2 | 11/2015 | Fietzek et al. | |
| 2013/0330243 A1 * | 12/2013 | Fietzek | C01B 13/11 422/186.18 |

FOREIGN PATENT DOCUMENTS

| | | |
|---|---|---|
| KR | 101164290 B1 | 7/2012 |
| KR | 20140010032 A | 1/2014 |
| WO | 9214677 A1 | 9/1992 |
| WO | 9709268 A1 | 3/1997 |

OTHER PUBLICATIONS

International Search Report and Written Opinion for International Application No. PCT/EP2016/050761, dated Apr. 11, 2016—14 Pages.
International Preliminary Report on Patentability for International Application No. PCT/EP2016/050761, dated Aug. 29, 2017, 7 pages.
International Preliminary Report on Patentability for International Application No. PCT/EP2016/050790, 7 pages.

* cited by examiner

OZONE GENERATOR WITH POSITION-DEPENDENT DISCHARGE DISTRIBUTION

CROSS-REFERENCE TO RELATED APPLICATIONS

This patent application is a U.S. National Phase Patent Application of PCT Application No. PCT/EP2016/050790, filed Jan. 15, 2016, which claims priority to German Patent Application No. 102015002103.6, filed Feb. 23, 2015, each of which is incorporated by reference herein in its entirety.

FIELD OF THE INVENTION

The present invention relates to an ozone generator, a wire fabric for use in a gas flow of an ozone generator, and an electrode arrangement.

BACKGROUND OF THE INVENTION

Generic ozonisers comprise a plurality of ozone generators, arranged in parallel to one another between two tube sheets in the manner of a tube-bundle heat exchanger. Internally, the tubes create discharge chambers in the form of hollow cathodes. Anode rods with dielectric are arranged in these discharge chambers, which during operation are impinged upon by a high voltage and which cause a silent discharge between the anode rod and the tube. An oxygenated gas or pure oxygen is passed through this interstice. The silent discharge generates ozone molecules in the oxygenated gas from oxygen molecules. The gas flow enriched with ozone in this way can, by way of example, be used for disinfection purposes.

Most of the electrical power that has to be supplied to an ozone generator results in waste heat. This waste heat is dissipated by cooling measures, such as for example liquid cooling of the outer electrode. Here, the cooling water heats up as it passes through the tube bundle and is cooled to a temperature of a few degrees Celsius in a circuit by a heat exchanger in a cooling unit.

A mechanism that impairs the efficiency of an ozoniser is the unavoidable temperature gradient that arises along the tubes between the cooling water entry and the cooling water exit.

The efficiency of ozonisers is highly dependent on the temperature in the discharge gap. The formation of ozone preferably takes place at low temperature. In addition, the ozone increasingly disintegrates as the temperature rises. This temperature-induced ozone depletion reduces the overall efficiency of the ozoniser. To raise the ozone yield, therefore, a targeted manipulation of the effective reaction temperature along the ozone generator is desired.

An ozone generator is known from JP-H-0881205 having a conical outer electrode, in contact with a dielectric, which in a first embodiment has a thickness that increases along the length of the ozone generator and in a second exemplary embodiment has a constant thickness. What these arrangements have in common is that the power recorded in the gas gap decreases continuously over the length of the ozone generator. In this way, the increase in temperature over the length of the ozone generator is reduced, as a result of which the effective reaction temperature can be kept almost constant. The disadvantage here is that the manufacture of the outer electrode and of the dielectric is relatively complicated and cost-intensive.

SUMMARY OF THE INVENTION

The object the present invention is to indicate an ozone generator in which the efficiency is increased by reducing the electrical power supplied to the electrode surface unit in the flow direction of the gas, wherein the ozone generator has the simplest and cheapest possible construction and a fabric, as well as to indicate an electrode arrangement for use in a gas flow of an ozone generator, in which the efficiency of the ozone generator is increased by reducing the electrical power supplied to the electrode surface unit in the flow direction of the gas.

The term "fabric" is known from textile engineering (woven or non-woven fabric). A fabric refers to any fabric that is manufactured from textile raw materials by a textile technology. Accordingly, in connection with the present patent application a fabric is understood to be any planar, curved or arched fabric manufactured by a textile technology. This includes unwoven fabrics, such as cloth, knits, weaves and nets, and fibre composites, such as non-wovens and wadding.

This object is solved by:

an ozone generator with a high-voltage electrode (5) and at least one counter electrode (1), which define an interstice, in which at least one dielectric (2) is arranged and though which a gas flows in the flow direction, wherein the high-voltage electrode (5) and the at least one counter electrode (1) are provided with a connection for an electrical voltage supply (7) to generate silent discharges, characterised in that a wire fabric is arranged in the gas flow, wherein the density of the fabric decreases in the flow direction, a wire fabric for use in a gas flow of an ozone generator, characterised in that the density of the fabric in the gas flow decreases in a flow direction determined by the gas flow, and an electrode arrangement with a central electrically non-conducting rod, a fabric surrounding the rod and a dielectric tube surrounding the fabric, that can be impinged upon by a gas flow through the fabric, characterised in that the density of the fabric in the gas flow decreases in a flow direction determined by the gas flow.

Accordingly, an ozone generator is provided with a high-voltage electrode and at least one counter electrode, which define an interstice in which at least one dielectric is arranged and through which a gas flows in the flow direction, wherein the high-voltage electrode and the at least one counter electrode are provided with a connection for an electrical voltage supply to generate silent discharges, wherein a wire fabric is arranged in the gas flow, the density of which decreases in the flow direction. Through a reduction in the density of the fabric the surface points, from which the silent discharges emanate, are varied along the ozone generator, so that the electrical power supplied in the flow direction of the gas reduces. An increase in temperature in the flow direction can thus be positively influenced, leading to an increase in the efficiency of the ozone generator. Since the simplest possible geometry can be selected for the ozone generator and the increase in efficiency is the result solely of the wire fabric, the ozone generator is simple and inexpensive to manufacture.

Here it is advantageous if the free cross-sectional area of the fabric increases in the flow direction. In areas of free cross-section, at a certain applied voltage no discharges take place, since the voltage is insufficient to ignite this gap width, so that the number of discharges per unit of length decreases with the increasing proportion of free cross-sectional area.

In one embodiment, the fabric is a mesh, the mesh size of which increases in the flow direction, preferably continuously. Meshes are simple to manufacture and therefore advantageous.

The high-voltage electrode is preferably formed at least partially of the fabric. Here it can also be provided that the fabric forms the high-voltage electrode in full.

In two preferred embodiments, the at least one counter electrode and the high-voltage electrode form a plate ozoniser or a tube ozoniser, in which the at least one counter electrode and the high-voltage electrode are aligned in a tubular and concentric manner to one another, and the fabric is a round hollow line. Here plate ozonisers are preferably used in small ozonisers, which are usually air-cooled. Tube ozonisers, on the other hand, are preferably used in large ozonisers, which have a plurality of ozone generators and are mostly water-cooled.

A one-gap system with a single counter electrode is preferably provided for, in which the high-voltage electrode is formed by the fabric, and wherein the dielectric in is arranged to be in contact with the counter electrode.

Also provided for is a wire fabric for use in a gas flow of an ozone generator, the density of which in the gas flow decreases in a flow direction determined by the gas flow.

Here it is advantageous if the free cross-sectional area of the fabric increases continually or in sections in the flow direction. In a preferred embodiment, the fabric is a mesh, the mesh size of which increases in the flow direction.

In one embodiment, it can also be provided that the fabric has a multi-part design with individual sections, wherein the fabrics of the individual sections have different densities. Here it is advantageous if the individual sections each have a constant mesh width, the mesh width increasing in the flow direction from one section to the next.

The wire fabric can function as an electrode provided with a connection for an electrical voltage supply.

An electrode arrangement is also provided for with a central electrically non-conducting rod, a fabric surrounding the rod and a dielectric tube surrounding the fabric, that can be impinged upon by a gas flow through the fabric, the density of the fabric in the gas flow decreasing in a flow direction determined by the gas flow. The fabric can further have the abovementioned features.

BRIEF DESCRIPTION OF THE DRAWING FIGURES

Figure 2:
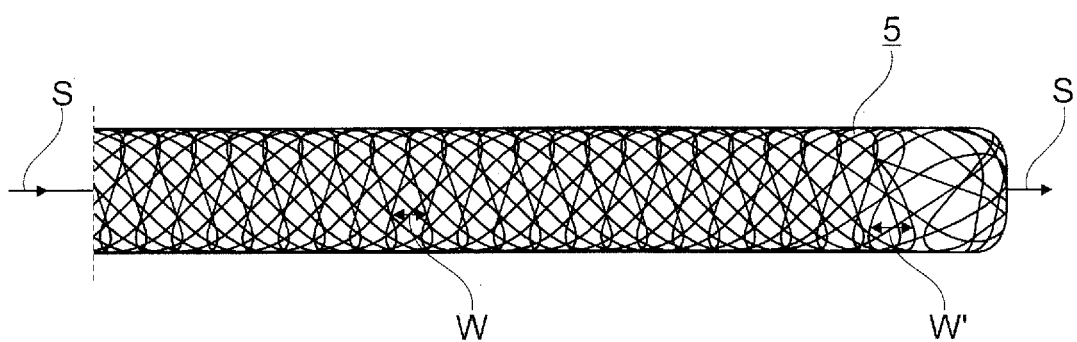

A preferred embodiment of the invention is explained in more detail below using the drawings, wherein:

FIG. 1: shows a perspective view of an electrode arrangement of the prior art, and FIG. 2: shows a schematic representation of a fabric according to the invention.

DETAILED DESCRIPTION OF THE INVENTION

FIG. 1 shows an electrode arrangement of an ozone generator, as is known from DE 10 2011 008 947 A1. Such ozone generators are used grouped together in a single ozoniser. Here the ozone generators are arranged in parallel to one another between two tube sheets in the manner of a tube-bundle heat exchanger and electrically connected in parallel. The ozone generator shown has a tubular outer electrode 1, a similarly tubular dielectric 2 and an internal rod 3, wherein the individual components are shown truncated and pulled apart in the axial direction. The arrangement is rotationally symmetric. The outer electrode 1, the dielectric 2 and the rod 3 are aligned concentrically to one another. Between the outer electrode 1 and the dielectric 2 is a wire mesh 4, which fills the interstice. Between the dielectric 2 and the rod 3 a corresponding fabric in the form of a wire mesh 5 is provided, which similarly fills the interstice located there. The outer electrode 1 is formed as a stainless-steel tube. The waste heat resulting from the ozone production is cooled by cooling water, which is passed over the outside of the outer electrode between the tube sheets. The dielectric 2 is a glass tube. The wire meshes 4 and 5 are preferably what are known as round hollow lines similarly made from a stainless-steel wire mesh. The rod 3 arranged in the centre of the electrode arrangement is an insulator, by way of example made from glass or another oxygen- and ozone-compatible material. The rod 3 can have a solid design. During operation, the electrode arrangement is impinged upon by an oxygenated feed gas, flowing through the wire meshes 4 and 5 in the direction of the arrow 6. An electrical voltage supply 7 is shown schematically in contact on one side with the outer electrode 1 and on the other with the mesh 5. The operating voltage provided by the voltage supply 7 brings about in the space between the electrodes 1, 5 and the dielectric 2 a silent electrical discharge, which generates ozone from the oxygen flowing in the direction of arrow 6 through the meshes 4 and 5.

In the structure shown, the inner electrode is formed solely by the mesh 5, while the rod 3 as the insulator performs a support function, ensuring at the same time the filling of the interior of the dielectric 2 with the wire mesh 5.

The gap width or striking distance d is the distance between an electrode and the dielectric. The electrical voltage supply 7 supplies the ozone generator with a sinusoidal voltage. The shape of the electrode results in a superimposition of volume and surface charge.

In contrast to ozone generators having a defined gap width, profiling the high-voltage electrode 5 or the fabric 5 results in specific surface points from which the discharges emanate.

The temperature in the gas gap is dependent, inter alia, on the wall temperature (coolant temperature) but also on the electrical power supplied. The electrical power supplied is in turn dependent upon the gap width ignited and the number of discharges.

According to the invention, the surface points available for discharge are varied along the ozone generator by means of the design of the fabric, so that the electrical power supplied decreases in the flow direction of the gas. Here, the average gap width remains substantially constant and the number of discharges per unit of length decreases.

Here the density of the fabric can be varied either continuously or discontinuously.

The number of discharges per unit of length along the ozone generator is influenced by changing the distribution of the surface points from which discharges emanate, the fabric forming the surface points. Here, the distance between the outer and inner electrode and the striking distance remain constant on average.

A first embodiment provides for the distribution of the surface points being generated by a change in the density of the fabric. The fabric generates a distribution of specific surface points from which discharges emanate. The remaining surface of the electrode is not available for generation of discharges. By varying the density of the fabric or of the free cross-section of the fabric in the flow direction of the gas, the number of discharges per unit of length can be reduced. One possibility for variation is to adapt the mesh width W, W' of a wire mesh electrode; see FIG. 2. Here the mesh width W, W' increases in the flow direction S, so that the number of discharges per unit of length in the flow direction S decreases.

The high-voltage electrode is an electrically conducting material, preferably stainless steel. The high-voltage electrode can be a wire mesh or a mesh, a fabric or a wire winding. Fibre structures such as fleece or felt are also suitable.

In one embodiment, this high-voltage electrode extends as far as the dielectric, for example there are points at which the mesh, fabric or similar rests against the dielectric.

The ozone generator according to the invention is not limited to a tubular electrode arrangement. Depending on the application, the ozone generator can take the form of either a tube or a plate ozone generator. Here application in both single-gap and multi-gap systems is envisaged. The electrically conducting material of the electrode can be introduced into the electrode space with or without carrier material.

Due to the variation according to the invention of the density of the fabric from which the discharges emanate, it is possible to reduce the electrical power supplied to the electrode surface unit in the flow direction of the gas and thus influence the gas temperature in the discharge gap and increase the efficiency of the ozone generator. Due to the particularly simple geometry of the electrode arrangement the ozone generator can be manufactured simply and inexpensively.

The invention claimed is:

1. An ozone generator comprising:
   a high-voltage electrode;
   at least one counter electrode,
   an interstice defined between the high-voltage electrode and the at least one counter electrode and configured to permit gas flow in a flow direction,
   at least one dielectric disposed in the interstice,
   a connection for an electrical voltage supply to the high-voltage electrode and the at least one counter electrode for generating silent discharges,
   wherein a wire fabric, disposed in the gas flow, has a density that decreases in the flow direction.

2. The ozone generator according to claim 1, wherein a free cross-sectional area of the fabric increases in the flow direction.

3. The ozone generator according to claim 1, wherein the fabric is a mesh, the mesh size of which continuously increases in the flow direction.

4. The ozone generator according to claim 1, wherein the high-voltage electrode is formed at least partially of the fabric.

5. The ozone generator according to claim 1, wherein the at least one counter electrode and the high-voltage electrode are plates that form a plate ozone generator.

6. The ozone generator according to claim 1, wherein the at least one counter electrode and the high-voltage electrode are tubular and aligned concentrically to one another, and the fabric defines a round hollow line.

7. The ozone generator according to claim 1, wherein the ozone generator includes a single counter electrode, the high-voltage electrode comprises the fabric, and the dielectric is arranged in contact with the single counter electrode.

8. A wire fabric for use in a gas flow of an ozone generator, wherein a density of the fabric in the gas flow decreases in a flow direction determined by the gas flow.

9. The wire fabric according to claim 8, wherein a free cross-sectional area of the fabric increases continuously or in sections in the flow direction.

10. The wire fabric according to claim 8, wherein the fabric is a mesh, the mesh size of which increases in the flow direction.

11. The wire fabric according to claim 8, wherein the fabric is a wire mesh, with a multi-part design with individual sections, wherein the fabrics of the individual sections have different densities.

12. The wire fabric according to claim 11, wherein the individual sections each have a constant mesh width, wherein the mesh width increases in the flow direction from one section to the next.

13. An electrode arrangement comprising:
    a central electrically non-conducting rod,
    a fabric surrounding the central electrically non-conducting rod, and
    a dielectric tube surrounding the fabric, that can be impinged upon by a gas flow through the fabric,
    wherein a density of the fabric in the gas flow decreases in a flow direction determined by the gas flow.

14. The electrode arrangement according to claim 13, wherein a free cross-sectional area of the fabric increases continuously or in sections in the flow direction.

15. The electrode arrangement according to claim 13, wherein the fabric is a mesh, the mesh size of which increases in the flow direction.

* * * * *